June 2, 1970   R. J. GALLAGHER   3,515,382
COMPRESSION SPRING
Filed Aug. 30, 1968   2 Sheets-Sheet 1
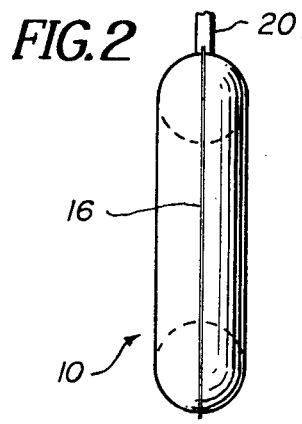
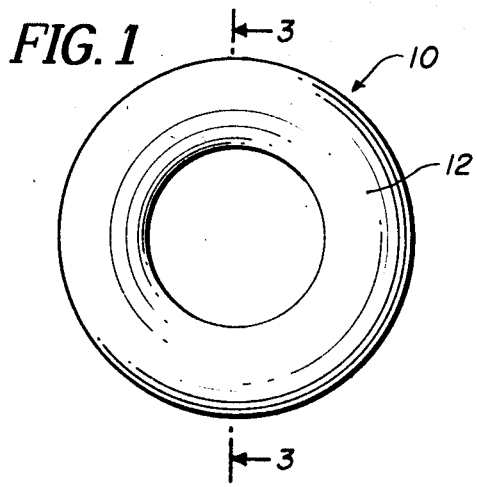
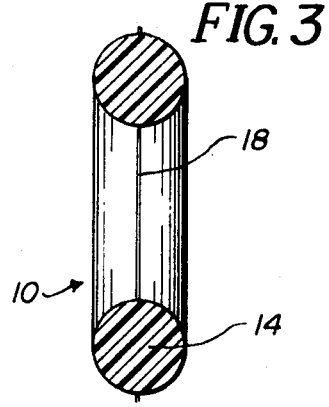
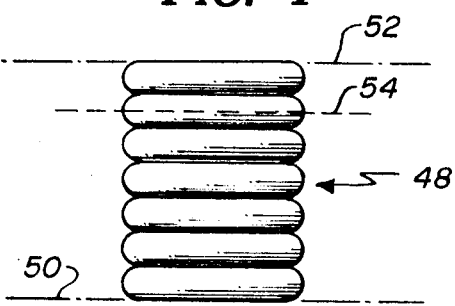
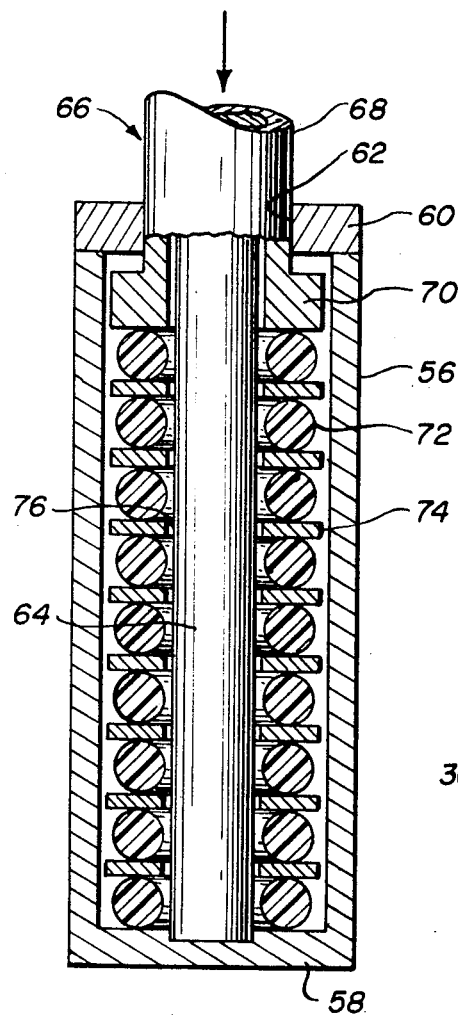
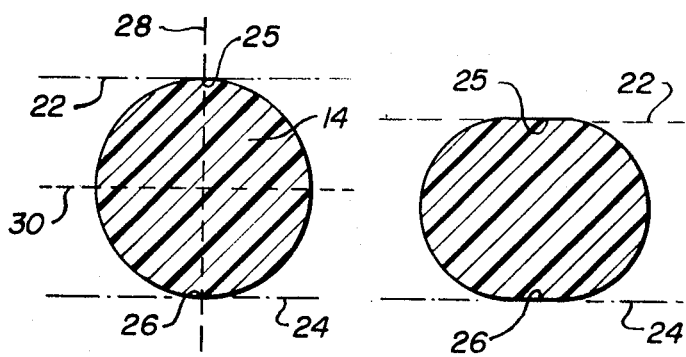
INVENTOR.
Richard J. Gallagher
BY
Dominik, Knechtel & Godula
Attys.

June 2, 1970   R. J. GALLAGHER   3,515,382
COMPRESSION SPRING

Filed Aug. 30, 1968   2 Sheets-Sheet 2

INVENTOR.
Richard J. Gallagher
BY
Dominik, Knechtel & Godula
Attys.

3,515,382
COMPRESSION SPRING
Richard J. Gallagher, 2030 Lehigh Ave.,
Glenview, Ill. 60025
Filed Aug. 30, 1968, Ser. No. 756,448
Int. Cl. F16f 1/40
U.S. Cl. 267—1                    10 Claims

ABSTRACT OF THE DISCLOSURE

A compression spring of one or more solid, elastomeric toroids having a hardness of about 88–97 on the Shore A scale. The elastomeric toroid has a substantially circular cross section so that favorable shape factors may be obtained, and such toroids are preferably cast of urethane.

---

This invention relates to a compressision spring, particularly a compression spring of one or more elastomeric toroids which operate in an improved manner to provide desired non-linear deflection under increasing compression loads.

Conventional metal coil or helical springs may be fabricated of heavy stock for heavy duty service. An inherent property of such springs, however, seriously limits the ability of such springs to accommodate heavy loads or sudden load surges. This inherent property is the linear compression of such springs under increasing loads, and such springs are generally designed not to compress more than 1/3 of their original length. In any event, such springs are limited to about 1/2 compression of their original length, at which time the individual coils bottom by metal to metal contact. Sudden load surges which exceed the compression accommodation of such springs occurs, for example, with heavy trucks which encounter deep road furrows, or the like.

This problem has been considered in the art, and among the efforts presented to meet such problems is the use of elastomeric bodies as compression springs. It is known, for example, to employ elastomeric blocks alone or bonded to metal plates. The bonded metal plate is known to increase the load-bearing capacity of such springs. Such an elastomeric block of hard rubber can be used alone or a plurality of such blocks may be stacked one on the other. The compressive stress and strain performances of such blocks provide some improvement in that the compression is not linear with increasing loads. Among the problems of such elastomeric blocks is the threat of "cold flow" or compression set when such blocks repeatedly deflect beyond a recognized level. It is recognized, for example, that an elastomeric spring having a generally square cross section, such as the elastomeric blocks, can deflect up to 80% relative to their original height under extremely heavy loads. It is further recognized that deflection should not exceed about 35% relative to the original height because deflections which exceed this level lead to the severe compression set or cold flow, and tensile stress which lead to rupture. Such an elastomeric block would have its shape changed permanently after a short period of use in which said deflection levels were repeatedly exceeded. The stress-strain compressive relationships of said elastomeric blocks are not adequate to solve the problem of sudden load surges, as for example with heavy trucks in which the load may attain two to three fold the weight of the truck upon encountering deep road furrows.

It is, therefore, one important object of the present invention to provide an improved compression spring in which a hard, elastomeric toroid is provided to obtain improved load-deflection relationships.

It is another important object of this invention to provide an improved compression spring having a hard-elastomeric toroid which exhibits varying shape factors under different loads so that a markedly improved compressive stress-strain or load-deflection relationship is attained.

Yet another important object of this invention is to provide an improved compression spring wherein one or more hard elastomeric toroids are employed, which toroids display a low shape factor under lower loads, and which shape factors are changed to higher levels under increasing loads so that substantial higher unit loads are required to attain a given degree of deflection under heavy load conditions.

Yet another important object of this invention is to provide an improved compression spring in which hard, elastomeric toroids are provided as solid, cast urethane bodies, said solid urethane toroids leading to the desired improved compressive stress-strain relationships in operations under heavy load conditions.

It is still another important object of the present invention to provide an improved compression spring in which a plurality of hard-elastomeric toroids having solid, cast urethane bodies, or the like, are stacked to attain the cumulative deflection of the predetermined number of toroids in such stack.

It is yet another important object of this invention to provide an improved compression spring in which a plurality of hard-elastomeric toroids are stacked and constrained within a housing or the like against displacement of their respective centers from a common axis, while allowing deflection of the toroidal body within a constraining housing or the like.

Objects such as the foregoing are now attained, together with still other objects which will occur from time to time to practitioners, by the invention of the following disclosure, including drawings wherein:

FIG. 1 is a side elevational view of a toroidal elastomeric compression spring;

FIG. 2 is an end elevational view of the compression spring of FIG. 1;

FIG. 3 is a view along section line 3—3 of FIG. 1;

FIG. 4 is a side elevational view of a cluster of elastomeric toroids stacked one upon the other in position between a supporting surface and a load-bearing surface;

FIG. 5 is a sectional view of a part of an elastomeric toroid under low load compression, indicated somewhat diagrammatically;

FIG. 6 is a view similar to FIG. 5 except that the toroid is shown under heavier loads;

FIG. 7 is a somewhat diagrammatic view, in side elevation and partly in section, of a compression spring including a plurality of hard, elastomeric toroids stacked one upon the other within a constraining housing;

Figure 8:
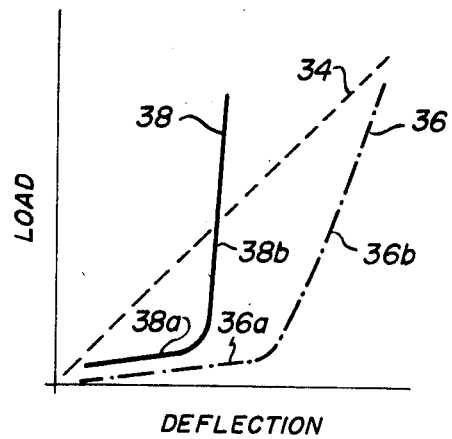
Figure 9:
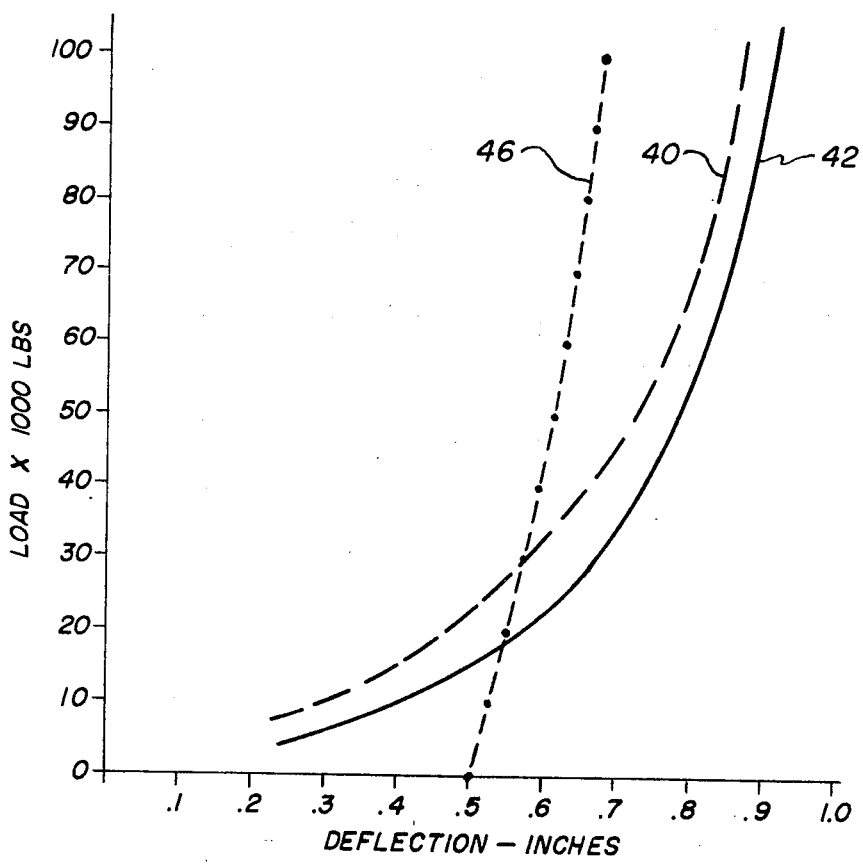

FIG. 8 is a graphic illustration representing load-deflection relationships of the improved compression springs of this invention contrasted with load-deflection relationships of other compression springs; and FIG. 9 is a graphic illustration showing the load-deflection relationship of elastomeric toroids of different hardnesses, and also showing the change in diameter of a selected elastomeric toroid under varying load conditions.

Use of the same numerals in the various views will indicate a reference to the same structures, parts, or other representations, as the case may be.

Referring now to FIGS. 1–3, the hard, elastomeric toroid 10 has an annular body 12, a substantially circular cross section 14, which may be somewhat oval. Such elastomeric toroids may be fabricated, molded, or made by a variety of still other ways. A preferred elastomeric material is hard urethane which may be cast during its pot life into concave chambers of mating mold halves through an opening formed by such mold halves. A cast elastomeric urethane toroid is indicated in the drawing as being formed in such a mold. An outer annular seam 16 and an inner seam 18 are indicated to depict the juncture of the mating mold halves. An elastomeric sprue 20 is shown as a part of the toroid in FIG. 2, such sprue being formed in the inlet passageway of the mating mold halves. Such sprues are removed by shearing or the like.

A particularly preferred elastomeric material to form toroidal body is hard urethane. When using the term "hard elastomer" herein, it is intended that such term correspond generally to a hardness of about Shore A 80. A preferred hardness range is about Shore A 88–97. Elastomers may be selected from materials other than the urethanes, for example, natural and synthetic rubbers, and rubbers bordered with carbon black fillers. The advantageous compressions-deflection relationships are realized by compression springs which include a stock of elastomeric toroids of different hardnesses and sizes. It is, however, preferred to use the harder elastomers, since they find particular acceptance for the heavy duty use. While the foregoing elastomers have usefulness, the urethanes have a particular added advantage. The hard elastomeric urethanes are additionally abrasion resistant and have a desirable property of resuming substantially their original volumes, even after repeated and severe compression loads. Such toroids may find use applications which include a plurality of toroids, or even a single toroid.

Practitioners in the urethane art will readily know how to formulate various urethane mixtures to attain solid, cast hard elastomers. It is known, for example, that the hardness of the urethanes will depend on the isocyanate content of the urethane. Such isocyanates are reacted with conventional polyols which may be the known polyethers, polyesters, and others. The urethane may also be provided in a prepolymer form in which smaller amounts of a polyol are premixed with an isocyanate, and then this prepolymer is later mixed with additional polyol. Known curing agents are then combined with the isocyanate to effect a cure into the solid, elastomer body. A variety of curing agents may be used but the amines are preferred, particularly diamines. Pigments may also be added, if desired, to provide desired colors in the formed toroid.

The substantially circular cross section of the toroid compression springs of this invention are characterized by a varying shape factor during different compression loads. The compression-deflection relationship of the elastomer is modified by the shape of the toroid. This shape may be expressed numerically as a "shape factor." The shape factor is defined as the ratio of the area of one loaded surface to the total area of the unloaded surfaces which are free to bulge. Referring to FIGS. 5 and 6, circular cross section 14 of a portion of a toroid 10 is shown between a load-bearing surface 22 and a supporting or load-transmitting surface 24. The depiction of FIG. 5 is intended to represent a lower load on the toroid. Such toroid has two loaded surfaces 25 and 26 which are of very small areas since they are essentially tangential points. The shape factor ratio will be very low since the loaded areas 25, 26 are very small relative to the remaining areas of the toroid which are free to bulge. Such remaining areas constitute substantially the entire circumferential area of the toroidal circular cross section.

FIG. 6 depicts a condition of severe loading in which the loaded surfaces 25, 26 are substantial in that they are more than mere tangential point contacts. The loaded surfaces have increased in area and the remaining circumferential area, which is free to bulge, has been accordingly reduced. This results in a higher shape factor. Under such higher shape factor, the amount of load to induce a given deflection also increases. In other words, deflection varies non-linearly with the higher loads.

The load may be considered as being directed along the axial dimension of the toroid which in the views of FIGS. 5 and 6 would be coincidental with dotted line 28. This axial dimension or load axis is parallel to the axis through the center of the toroid. The toroid body deflects along a radial dimension which may be viewed as being coincidental with dotted line 30. The radial dimension or deflection axis lies in a plane which is normal to the axial dimension or axis of the toroid. It will be appreciated that as the load axis decreases, the deflection axis increases and the shape factor increases.

The improved properties of the compression springs of this invention may be appreciated from the diagrammatic load-deflection curves of FIG. 8. The broken line 34 is intended to represent the linear relationship of load and deflection with conventional metal spring coils. Under such a curve, bottoming of the individual coils can be expected under heavy loads, as well as compression set with repeated deflections beyond the prescribed level of about 35% of the original length of the coil spring. The known rubber blocks with bonded steel plate have a load-deflection relationship somewhat as indicated by the dot-dash curve 36. It will be seen that the deflection is non-linear, but that the degree of deflection is relatively extensive. The substantially horizontal parts of the curve 36a represents a low shape factor, and the substantially vertical part 36b represents the high shape factor. The solid line 38 diagrammatically depicts the load-deflection relationship of the compression springs of this invention. It will be seen that a relatively lesser deflection operates for equivalent load-bearing conditions. The substantially horizontal part 38a of the curve represents the lower shape factor, and the substantially vertical part 38b represents the higher shape factor.

The relatively greater deflection of the conventional hard rubber blocks, in practice, often exceeds 35% of an original dimensional extent, usually the height. Such blocks often attain deflections of about 65% of their original dimensions. It will be seen how this will accelerate compression set or cold flow or failure. The compression springs of this invention do not exceed about 35% deflection of their original dimensions and the toroids resume about 95% of their original dimensions even after extended and repeated use under heavy load conditions.

The preferred toroids will be hard elastomers preferably urethane. There is no particular hardness which is critical with respect to attaining the advantages of the invention, and this is demonstrated by the curves of FIG. 9. Curve 40 depicts the load-deflection of a cast, solid urethane toroid having a Shore A hardness of 95, and curve 42 depicts the load-deflection of a soid cast urethane toroid of Shore A hardness 90. Both toroids have the same inside and outside diameters and the same cross sectional configuration before load deflection. The deflection is measured in inches by which the axial dimension of the toroid was shortened. It is seen that the harder urethane toroid has a slightly better curve in that less deflection along the radial dimension of the toroid body is encountered for comparable loads. Curve 46 illustrates the average increase in the outside diameter of the two toroids over the load range. In reading curve 46 alone, the abcissa units should be considered whole inches and not fractions thereof. In other words, the outside diameter of the toroid averages an increase of about 1.7 inches under 100,000 pounds load. After the loads were removed, and following a fifteen minute recovery period, the outside diameters of the toroid, resumed a shape within about .08 inch of the original outside diameters. Thus, even within this very short period following removal of the load, the shape has substantially resumed the original axial and radial dimensions of the toroids.

While a single toroid alone may be used as a compression spring, many applications will require a cluster of toroids stacked one on top of the other as indicated in FIGS. 4 and 7. In FIG. 4, a cluster 48 of a plurality of toroids are placed between a supporting surface or load-transmitting surface 15 and a load-bearing surface 52. The individual toroids are of like dimensions with respect to their inside and outside diameters and their original cross sectional configurations. All the toroids are stacked so their centers are positioned along a common axis. A plane which bilaterally bisects each toroid, such as plane indicated by dotted line 54, is perpendicular to the common axis. Such a plane may be carried to as a radial plane since it corresponds generally to the radial axis or deflection axis 30 of the toroid. The radial planes of the respective toroids are parallel to one another, as is apparent from considering FIG. 4. It will be seen that the compression spring comprising the stack of toroids in FIG. 4 does not include any means to constrain the displacement of the individual toroids so that their respective centers cannot move away from a common axis, that is, nothing except the force of the load-bearing surface 52.

In FIG. 7, the compression spring includes constraining means such as a cylindrical housing 56 with a circular bottom wall 58 and a top circular cover 60 having a central aperture 62. A cylindrical shaft or stake 64 is within the housing in spaced relationship to the cylindrical or continuous wall 56. A piston or load-bearing member 66 comprises a sleeve having a continuous wall 68, and a flange 70 joined to the bottom of the sleeve 68. The load bearing member 66 will reciprocably move on shaft 64 under the urgings of a load, indicated by the arrow, and by the return travel of the compression spring following removal of the load. The spring includes a plurality of solid, cast urethane toroids, one of which is shown at 72. All the toroids have like inside and outside diameters and like circular cross sections in their normal, non-deflected condition. The plurality of toroids are stacked one upon the other and their respective centers lie along a common axis. The individual toroids are separated by flat annular plates, one of which is shown at 74. Each of the plates has a central passageway 76 which is slightly enlarged relative to the cylindrical shaft 64. The plurality of plates are loosely stacked between adjoining toroids and are not bonded thereto. Such plates tangentially contact the toroids under no load conditions, but such contact areas increase under increasing loads.

A compression spring including a cluster of toroids stacked one upon the other, as in FIGS. 4 and 7, obtains the cumulative deflection of all the toroids upon application of a given load. The load-bearing capacity of such a spring is still the load-bearing capacity of any one toroid in the assembly.

The particular dimensions of the toroid may be varied by the practitioner to meet particular service demands. As a representative example, it has been found desirable to form a toroid in which the inside diameter of the toroid is about twice as great as the cross sectional diameter or the axial dimension of the toroidal body. Expressed differently, the outside diameter of the toroid has been dimensioned so that it is about 5–6 times the diameter of the cross sectional configuration of the toroidal body. While such particular dimensional ranges have been found useful for certain heavy duty compression springs, it will be appreciated that they are only representative of the possible dimensions that can be selected by practitioners.

An example of a useful urethane composition for casting a solid, elastomer urethane body is made from the following ingredients:

| | Parts |
|---|---|
| Polyether type urethane elastomer | 100 |
| Diamine curing agent | 19½ |
| Black pigment | 2.5 |

The polyether type urethane elastomer is obtained from Du Pont under the trade designation of Adiprene L–167. It has an isocyanate content of 6.05–6.55%. The aromatic amine curing agent is supplied under the trade designation of MOCA and it is chemically known as methylene bis orthochoroaniline. Black pigment is obtained under the trade designation Ferro V780 from the Ferro Corporation of Cleveland, Ohio and such pigments are provided as concentrates dispersed in liquid epoxy pastes.

The curing agent is added in known amounts to a given isocyanate, terminated prepolymer, and it is recognized that curing is impaired with lowered or higher amounts than recommended, and that the desired physical properties of the cured urethane will be progressively lost with such lower or higher amounts. Urethane compositions which can be used to advantages for purposes of the invention generally include from about 70 to about 90 parts of a urethane polymer containing at least about 4–9 percent by weight of an isocyanate, and about 8 to about 28 parts of a diamine curing agent, preferably a diamine.

What is claimed is:
1. A compression spring including
   a solid hard elastomer toroid, said toroid having a uniform cross section which is substantially circular, said toroid being compressible to less than about 35% relative to its original dimensional extent under loads encountered in expected use, and said toroid having a hardness of about 80–97 on the Shore A scale, said toroid deflecting non-linearly with increasing loads.
2. A compression spring as in claim 1 in which said toroid has a hardness of about 88–97 on the Shore A scale.
3. A compression spring as in claim 1 wherein the inside diameter is about two times said cross sectional diameter.
4. A compression spring as in claim 1 wherein said solid hard elastomer is cast urethane having a hardness of about 88–97 on the Shore A scale.
5. A compression spring including
   a plurality of like-dimensioned elastomeric toroids stacked in a cluster, each of said toroids being a solid elastomer having a uniform cross section which is substantially circular, each of said toroids having a hardness of about 80–97 on the Shore A scale, said toroids deflecting along their axial dimensions to less than about 35% relative to their original circular cross sections under loads encountered in expected use and applied normal to the radial planes of said toroids, and the centers of all the toroids being co-axial, whereby said compression spring depicts the cumulative deflection of the plurality of toroids.
6. A compression spring as in claim 5 wherein the elastomers of each of said toroids have a hardness of about 88–97 on the Shore A scale.
7. A compression spring as in claim 6 wherein said elastomer is cast urethane.

8. A compression spring as in claim 6 in which said plurality of toroids are clustered about a shaft passing through the aligned passageways of said toroids.

9. A compression spring as in claim 6 wherein said cluster of toroids are within a housing which constrains said toroids against displacement of their centers from a common axis, but which permits deflection in a direction along the common axis of said toroids.

10. A compression spring as in claim 9 and further including a plurality of separating plates, each plate being positioned between two adjoining toroids, said plate tangentially contacting the toroids and said tangential contact being increased upon application of loads to the compression spring.

References Cited

UNITED STATES PATENTS

| | | | |
|---|---|---|---|
| 2,819,060 | 1/1958 | Neidhart | 267—1.53 |
| 3,086,765 | 4/1963 | Zanow | 267—63 |

JAMES B. MARBERT, Primary Examiner